United States Patent Office 2,980,081
Patented Apr. 18, 1961

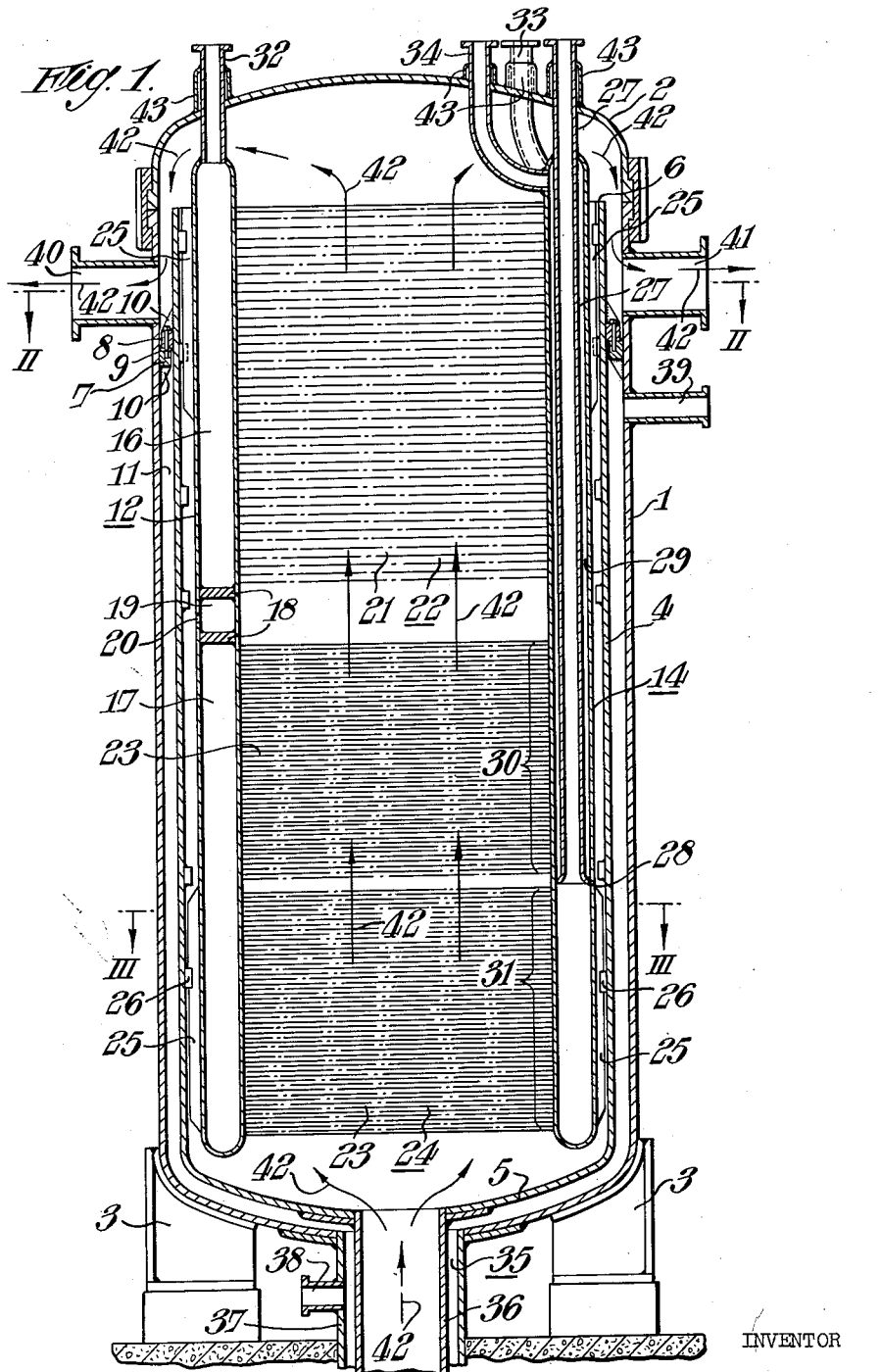

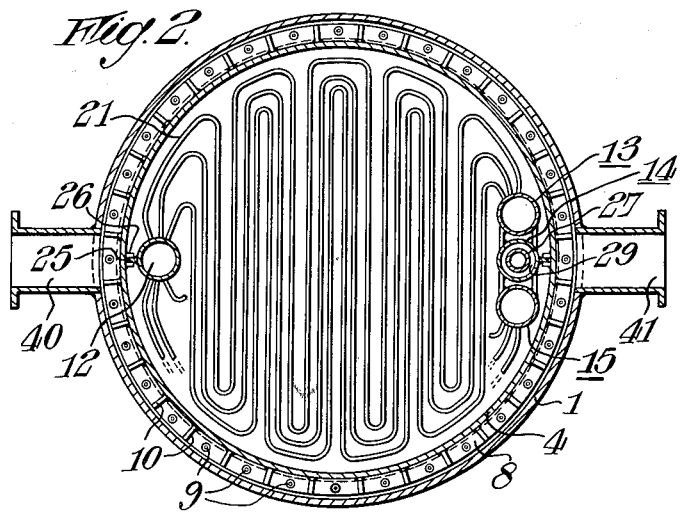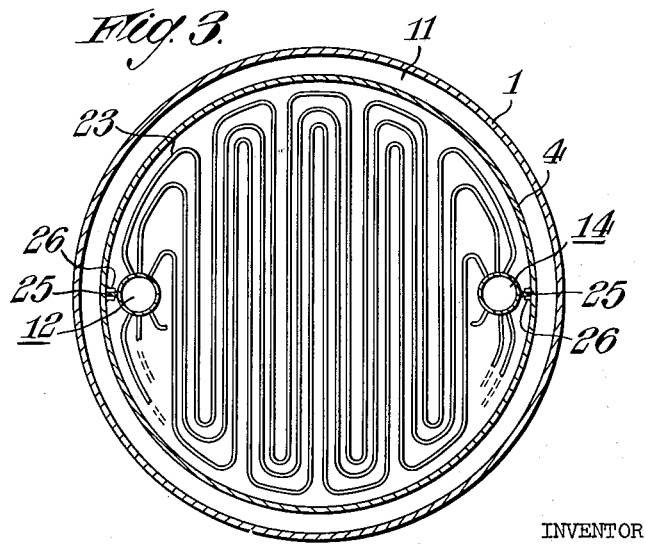

2,980,081
APPARATUS FOR THE EXCHANGE OF HEAT BETWEEN FLUIDS

Michael Gordon Bennett, Rotherham, England, assignor to the United Kingdom Atomic Energy Authority, London, England Filed Feb. 9, 1959, Ser. No. 792,046

Claims priority, application Great Britain Feb. 11, 1958

2 Claims. (Cl. 122—7)

This invention relates to heat exchangers of the type comprising a shell providing a flow path for a primary heat carrying fluid and containing a bank of tubes for the passage of a secondary fluid.

In the known use of such a heat exchanger as a boiler for steam generation, a gas heated in passage through the core structure of a nuclear reactor is passed through the shell of the heat exchanger, water and the steam consequently generated being passed through the tubes which are grouped to form economiser, evaporator and superheater sections.

In operation the shell attains the temperature of the hot gas and consequently a limitation is imposed on the gas temperature dependent on the material of the shell. The limitation imposed on the gas temperature also limits the temperature of steam generation. For conventional steel shells operating under pressure the gas temperature limitation is about 700° F. This temperature limit can be increased by using special steels but costs and fabrication techniques introduce difficulties.

It is an object of the present invention to provide a heat exchanger of the kind described suitable for steam generation using heat from a high temperature and high pressure gas (circa 1000° F. at about 150 p.s.i.), being capable of construction from conventional steels suitable for pressure vessels.

According to the invention a heat exchanger of the type comprising a shell having inlet and outlet pipes providing a flow path for a primary heat carrying fluid and containing a bank of tubes having inlet and outlet pipes for the passage of a secondary fluid, and suitable for steam generation using heat from a high temperature gas passing through the said shell, has the said tubes grouped to form evaporator and superheater sections, water cooling means for the inner wall of the shell in a zone extending from the gas inlet pipe of the shell to shield the shell from the full temperature of the inlet gas and to provide an economiser section, and a flow connection from said water cooling means to said evaporator section.

One embodiment of the invention will now be described by way of example with reference to the accompanying drawings in which:

Fig. 1 is a longitudinal sectional elevation.

Fig. 2 is a sectional plan along the line II—II in Fig. 1.

Fig. 3 is a sectional plan along the line III—III in Fig. 1.

In the drawings there is shown a heat exchanger suitable for the generation of superheated steam using gas heated in passage through the core of a nuclear reactor.

The heat exchanger comprises a cylindrical gas tight pressure shell 1 having a removable upper end cap 2. The pressure shell 1 is vertically orientated in a raised position and is mounted on bottom support brackets 3 which are of welded construction. A cylindrical vessel 4 having a domed lower end 5 and an open upper end 6 is suspended coaxially within the shell 1 from a flange 7 welded inside the shell 1. The vessel 4 has an externally welded flange 8 which locates on the flange 7 to support the vessel 4 within the shell 1. The flanges 7 and 8 are held in connection by bolts 9 and are stiffened by triangular webs 10. An annular cavity 11 is defined between the shell 1 and the vessel 4. Four tubular manifold pipes 12, 13, 14 and 15 extend longitudinally through the vessel 4 the three manifold pipes 13, 14 and 15 being placed in a group diametrically opposite to the manifold pipe 12. The manifold pipe 12 is partitioned into an upper part 16 and a lower part 17 by transversely welded plates 18 spaced apart so that an inert gas space 19 is defined between the plates 18. The gas space 19 is in connection with the interior of the vessel 4 through a bleed hole 20 in the manifold pipe 12. The upper zone 16 of the manifold pipe 12 is connected with both the manifold pipes 13 and 15 by tubes 21 which extend sinuously across the intervening space in the vessel 4. The tubes 21 form the evaporator section 22 of the heat exchanger. The lower zone 17 of the manifold pipe 12 is connected with the manifold pipe 14 by tubes 23 also extending sinuously across the intervening space in the vessel 4. The tubes 23 form the superheater section 24 of the heat exchanger. The manifold pipes 12, 13, 14 and 15 and the tubes 21 and 23 form a rigid assembly located in the vessel 4 by longitudinal fins 25 welded to the manifold pipes 12 and 14 and engaging with keyways 26 welded inside the vessel 4. A pipe 27 sealed in passage through the end cap 2 of the shell 1 extends coaxially through the manifold pipe 14 to a point halfway along the region of the manifold pipe 14 with which the tubes 23 are connected. The pipe 27, which is sealed in the manifold pipe 14 at its point of entry and at its internal end 28 defines an annular zone 29 in the manifold 14. The superheater section 24 of the heat exchanger formed by the tubes 23 is thus divided functionally into two zones, i.e., an upper zone 30 in which the tubes 23 connect with the annular zone 29 in the manifold pipe 14 and a lower zone 31 in which the tubes 23 connect with the main part of the manifold pipe 14 below the end 28 of the pipe 27. Pipes 32, 33 and 34 passing through the end cap 2 of the shell 1 connect respectively with the manifold pipes 12, 13 and 14. A second pipe 33 connecting with the manifold pipe 15 is identical to the pipe 33 connecting with the manifold 13. The pipes 32, 33 and 34 are sealed in passage through sleeves 43 welded to the end cap 2. The sleeves 43 accommodate movements between the pipes and the end cap 2 consequent upon temperature fluctuation. Water is admitted to the cavity 11 between the vessel 4 and the pressure shell 1 thus forming a water jacket cooling means for the inner wall of the shell 1. Water is admitted to the cavity 11 through an annular inlet zone 35 defined between a pipe 37 connecting with the shell 1 and a gas inlet branch 36 connecting with the vessel 4 at the lower domed end 5 thereof. A water inlet pipe 38 is provided connecting with the pipe 37 and a water outlet connection 39 is welded in connection with the shell 1 immediately below the flanges 7 and 8. Diametrically opposed gas outlet branches 40 and 41 are provided connecting with the shell 1 immediately above the flanges 7 and 8.

In use of the heat exchanger gas heated in passage through the core structure of a nuclear reactor is passed into the vessel 4 through the inlet branch 36. The hot gas traverses the vessel 4 passing over the tubes 21 and 23. The gas then passes out of the vessel 4 through the open end 6 and leaves the shell through the outlet branches 40 and 41. The movement of the hot gas is as shown by the arrows 42 in Fig. 1. Water is fed into the annular cavity 11 between the shell 1, and the vessel 4 through the inlet pipe 38. The water serves to cool the shell 1, and is heated in passage through the cavity 11 which serves as the economiser section of the heat exchanger. Water is passed from the cavity 11 through the outlet connection 39 to a steam drum (not shown in the drawings) where water/steam separation is effected, the steam passing to the superheater section 24. From the steam drum water is passed into the manifold pipes 13 and 15 through the pipes 33 and then moves through the tubes 21 forming the evaporator section 22 of the heat exchanger. Wet steam which is generated in the tubes 21 passes into the upper zone 16 of the manifold pipe 12 and then to the steam drum where water/steam separation is effected. The water separated in the steam drum is passed with water entering the steam drum from the cavity 11 into the manifold pipe 13 and 15 while the steam separated in the steam drum is passed through the pipe 34 into the outer annular zone 29 of the manifold pipe 14. From the zone 29 the steam passes through the tubes 23 forming the upper zone 30 of the superheater section 24 of the heat exchanger. The steam superheated in passage through this upper zone 30 passes into the lower part 17 of the manifold 12 and then passes back through the tubes 23 forming the lower zone 31 of the superheater section 24 of the heat exchanger. The superheated steam is passed through the manifold pipe 14 and the pipe 27 to a steam utilisation plant where useful power is generated.

I claim:

1. A heat exchanger of the type comprising a pressure resisting shell having inlet and outlet branches providing a flow path for a pressurised primary heat carrying fluid and containing a bank of tubes in the path between said inlet and outlet branches for the passage of a secondary fluid suitable for vapour generation using heat from said pressurised primary heat carrying fluid, said bank of the tubes being arranged in two groups to form evaporator and superheater sections in the shell, said evaporator section occupying the end of the shell nearest to the outlet branch and said superheater section occupying the end of the shell nearest to the inlet branch, inlet and outlet pipes to the group of tubes forming the evaporator section, inlet and outlet pipes to the group of tubes forming the superheater section, water jacket cooling means for the inside wall of the shell in a region extending from said inlet branch over a zone including the group of tubes forming said superheater section, an outlet flow connection from said water jacket cooling means at its extremity nearest the outlet pipe from the shell and an inlet connection to said water jacket cooling means annularly about said inlet branch, said shell being vertically orientated and closed at its ends by upper and lower end caps, said group of tubes forming the evaporator section extending across the upper region of the shell and being connected between the inlet and outlet pipes to the evaporator section, said inlet and outlet pipes to the evaporator section penetrating the upper end cap and extending longitudinally into the shell.

2. A heat exchanger as claimed in claim 1 characterised in that the group of tubes forming the superheater section of the heat exchanger extends across the lower region of the shell and are divided into upper and lower zones, said inlet pipe to the superheater section penetrating the upper end cap of the shell, extending longitudinally into the shell and being closed at its lower end, said outlet pipe from the superheater section being coaxially arranged in said superheater section inlet pipe and sealed at its lower end to the superheater section, the outlet pipe of the evaporator section being partitioned into upper and lower parts at a point between the evaporator and superheater sections, the tubes of the superheater section in the upper zone being connected between the lower part of the evaporator section outlet pipe and the inlet pipe of the superheater section above the lower end of the superheater section outlet pipe, the tubes of the superheater section in the lower zone being connected between the lower part of the evaporator section outlet pipe and the inlet pipe of the superheater section below the lower end of the outlet pipe of the superheater section.

References Cited in the file of this patent
UNITED STATES PATENTS

| | | |
|---|---|---|
| 2,045,668 | Mooney | June 30, 1936 |
| 2,547,589 | Marshall | Apr. 3, 1951 |
| 2,552,044 | Huet | May 8, 1951 |